United States Patent [19]
Daniel

[11] 4,072,612
[45] Feb. 7, 1978

[54] AERATOR FOR BODIES OF WATER

[76] Inventor: William H. Daniel, Rte. 3, Rogers, Ark. 72756

[21] Appl. No.: 791,531

[22] Filed: Apr. 27, 1977

Related U.S. Application Data

[63] Continuation of Ser. No. 689,927, May 25, 1976, abandoned.

[51] Int. Cl.² .............................. C02C 5/06; B01F 3/04
[52] U.S. Cl. ..................................... 210/169; 210/196; 210/220; 210/315; 210/446; 210/416 AS; 261/DIG. 75
[58] Field of Search ................. 210/14, 15, 44, 60, 210/63 R, 63 Z, 169, 170, 220, 221 R, 315, 316, 317, 416 AS, 196, 446; 261/4, 29, 92, 120, 121 M, DIG. 75; 415/213 R

[56] References Cited
U.S. PATENT DOCUMENTS

| | | | |
|---|---|---|---|
| 1,722,945 | 7/1929 | Pruss | 210/14 |
| 2,044,096 | 6/1936 | Moran | 210/315 X |
| 2,778,499 | 1/1957 | Chamberlain et al. | 210/44 X |
| 3,263,811 | 8/1966 | Baker et al. | 210/416 AS X |
| 3,561,602 | 2/1971 | Molitor | 210/317 X |
| 3,640,516 | 2/1972 | Willinger | 210/169 X |
| 3,671,022 | 6/1972 | Laird et al. | 261/29 |
| 3,734,640 | 5/1973 | Daniel | 415/213 R |
| 3,772,187 | 11/1973 | Othmer | 210/60 X |
| 3,837,627 | 9/1974 | Sence et al. | 261/29 |
| 3,872,012 | 3/1975 | Endicott | 210/315 |
| 3,925,203 | 12/1975 | Turner | 210/63 R |
| 3,956,124 | 5/1976 | Fast et al. | 210/63 R |

Primary Examiner—Charles N. Hart
Assistant Examiner—Robert H. Spitzer
Attorney, Agent, or Firm—Young & Thompson

[57] ABSTRACT

An aerator for bodies of water comprises a submerged water intake with a filter on it, that leads to the axial inlet of a centrifugal pump of the type that can handle substantial quantities of air. An air inlet to the axial pump inlet introduces the air centrally into the pump chamber, where it is admixed with water and discharged from a peripheral outlet to a point beneath the surface of the water. The pump can be of the type that has a rotor with a plurality of vanes of airfoil configuration.

3 Claims, 5 Drawing Figures

AERATOR FOR BODIES OF WATER

This is a continuation of application Ser. No. 689,927, filed May 25, 1976, now abandoned.

The present invention relates to aerators for bodies of water, more particularly of the type that introduces a stream of mixed air and water beneath the surface of a body of water to be aerated. The invention is applicable, among other things, as an aerator for fish tanks and for bodies of liquid sewage, and will be illustrated by way of example in connection with the aeration of a fish tank.

It is accordingly an object of the present invention to provide an aerator for bodies of water, which introduces a great quantity of air beneath the surface of the water.

Another object of the invention is the provision of such an aerator that aerates, cleans and cools the water in a single action with but one power unit.

Finally, it is an object of the present invention to provide such an aerator, which will be relatively simple and inexpensive to manufacture, easy to assemble, install, maintain and repair, and rugged and durable in use.

Other objects and advantages of the present invention will become apparent from a consideration of the following description, taken in connection with the accompanying drawing, in which:

FIG. 4 is an enlarged cross-sectional view of the pump of the present invention, viewed in a direction parallel to the axis of the pump and showing the pump rotor head-on.

Figure 1:
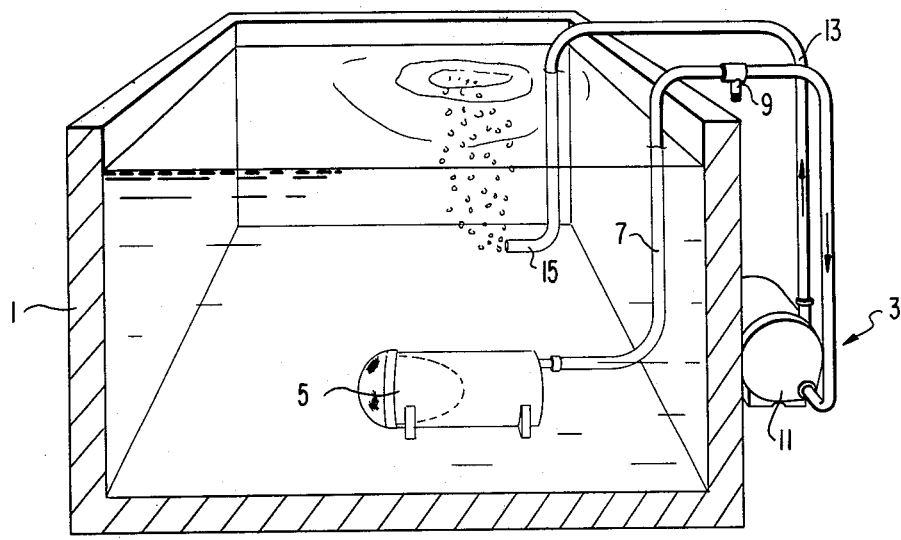
FIG. 1 is a somewhat schematic perspective view of a tank equipped with an aerator according to the present invention, one wall of the tank being removed for clarity.

Referring now to the drawing in greater detail, and first of all to FIG. 1, there is shown an aerator according to the present invention installed in a tank 1 filled with water to be aerated, which in the illustrated enbodiment is a fish tank. The aerator is shown generally at 3, and comprises an intake filter 5, a flexible intake conduit 7 for filtered water, the conduit 7 extending at its lower end from filter 5 over the top edge of the tank 1 and past an air inlet 9 by which air is aspirated into conduit 7, and thence to the central or axial inlet of a centrifugal pump 11 whence the mixed air and water is discharged through an outlet conduit 13, back over the top edge of the tank 1 and thence down into the tank through conduit 13 to the discharge end 15 of discharge conduit 13, from which issues the mixed stream of air and water, the air rising in the form of bubbles which are desirably finely divided and multitudinous for the purpose of aerating the water in tank 1.

Figure 2:
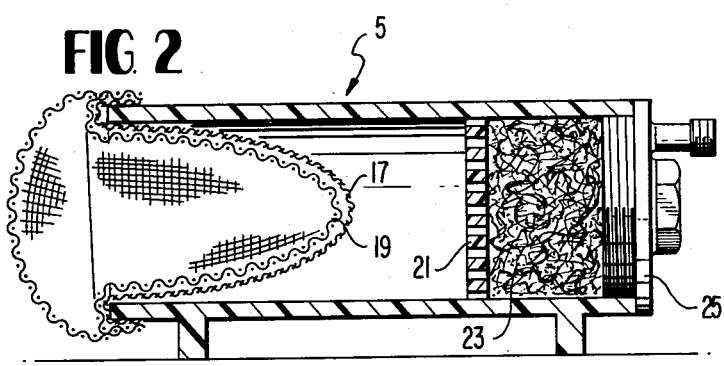
FIG. 2 is an enlarged cross-sectional view of a filter for use on the intake end of the intake conduit of the aerator of the present invention.

Referring now to FIG. 2, the filter 5 is shown in enlarged cross section, as comprising a horizontal cylindrical casing that is open at one end to receive a mesh filter 17 of fine gauze or the like which may, for example, be nylon stocking material and which is in a generally conical configuration overlying the open end of the filter casing and having its margins overlying the outer edge of the open end of the filter casing. To hold filter 17 in place, a coarse screen 19 of the same generally conical configuration fits on the outer side of filter 17 and overlies the outer edges of filter 17 releasably to retain filter 17 on the open outer end of the filter casing by a spring-clip action. Screen 19 also has a generally dome-shaped outer portion that is useful, in the case of a fish tank, to prevent fish from taking up residence in the cave provided by the conical portion of screen 19 and filter 17.

Filter 5 also contains a perforated plate 21 behind which may be disposed a mass of filter medium 23 such as activated charcoal, fuller's earth or other known filter material, which in turn is confined on its side opposite plate 21 by screen material (not shown), this end of the casing of filer 5 being closed by a screw-threaded removable cap 25 which is transected on its upper side by an outlet that detachably receives the end of flexible intake conduit 7.

The provision of the filter on the intake end, rather than on the discharge end of the aerator, has been found to be particularly advantageous, in that the flocculated material to be filtered out moves only slowly toward and against the mesh filter 17 and is retained there without being broken up into finer particles, as would be the case if the material to be filtered out first passed through the pump and was filtered out only downstream of the pump.

It will be understood that filter 17 will become clogged from time to time and must be cleaned. To do so, one reaches into the tank and grasps the filter 5 and draws it up to the surface, open end first, so that material caught on filter 17 will remain there as the filter leaves the water. The fact that conduit 7 is flexible permits this operation. Then filter 5 will be rotated relative to cap 25 to unscrew the filter from the cap, and the water drains out from filter 5. The filter 5 released from cap 25 and conduit 7 can then be cleaned; and this is done by removing coarse screen 19, whereupon the gauze material of filter 17 can hang down when the open end of filter 5 is pointed downward. Material accumulated on the filter 17 can then be flushed off with water, screen 19 replaced, the filter screwed back onto its cap 25 and returned to the FIG. 1 position, whereupon the operation of the device can resume.

Figure 3:
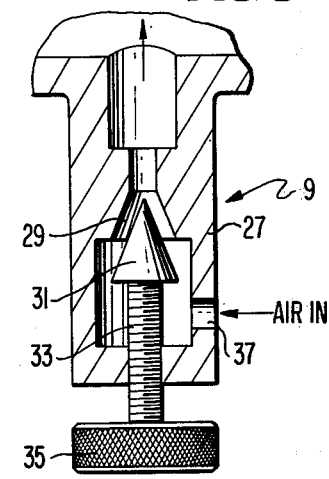
FIG. 3 is an enlarged fragmentary cross-sectional view of the air inlet of the present invention.

As indicated above, air is aspirated or inducted into the axial intake of the pump 11, by means of a air inlet 9. This inlet is shown in greater detail in FIG. 3, and comprises a fitting 27 attached to and communicating with the interior of intake conduit 7. Fitting 27 is traversed axially by a bore providing a conical seat 29 for a needle valve 31 carried by a screw-threaded shank 33 that is screw-threadedly engaged in fitting 27. A knurled knob 35 outside fitting 27 is secured to shank 33 and permits manual adjustment of the setting of needle valve 31 thereby to admit more or less air into intake conduit 7, the air entering through an air inlet port 37 in the side of fitting 27.

The cross-sectional air of the air inlet passageway will always be much less than that of the water intake conduit 7. For example, with an intake conduit 7 having an internal diameter of one inch, it has been suitable to provide an air inlet 9 which is 1/64th inch in diameter. As the air inlet opening is on the suction side of the pump, there is considerable inspiration of air through air inlet 9, and so there is a considerable quantity of air in admixture with the water that emerges from the pump outlet. It is desirable to close air inlet 9 during cleaning of the filter 5, in order to maintain the prime of pump 11.

The pump 11 is of the centrifugal type adapted to handle substantial quantities of air in addition to water on its intake side, without losing its prime. Two examples of such pumps that are suitable for use in the present invention are disclosed in my U.S. Pat. Nos. 3,261,297 and 3,734,640, the disclosure of which is incorporated into this application by reference. The pump illustrated in FIGS. 4 and 5 is substantially the same as that of the latter patent.

Figure 4:
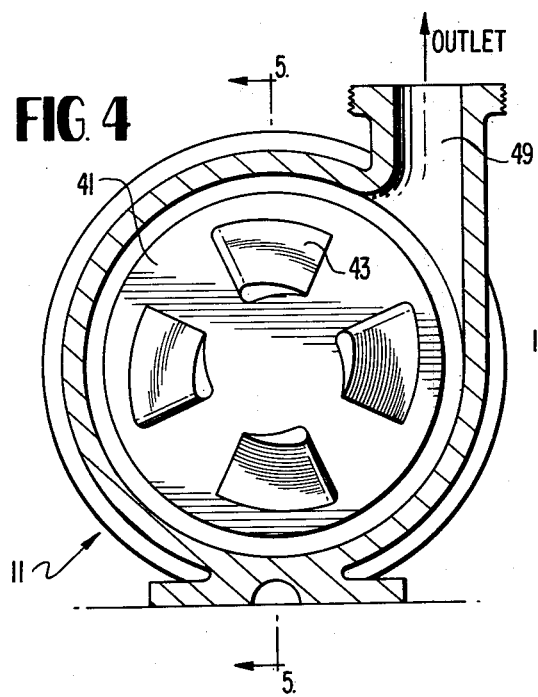
Figure 5:
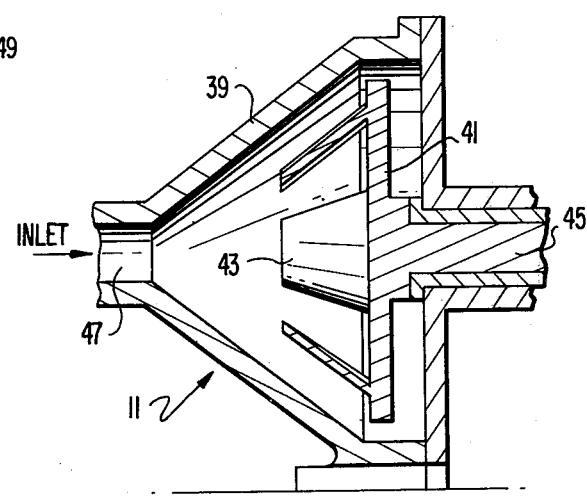
FIG. 5 is cross-sectional view on the line 5—5 of FIG. 4.

Thus, referring now to FIGS. 4 and 5, pump 11 is seen to comprise a conical casing 39 in which turns a rotor 41 that bears impeller blades 43 of airfoil configuration, whose leading and trailing edges converge radially inwardly. Rotor 41 is mounted on and rotated by drive shaft 45 from a pump motor (not shown) and receives mixed air and water through its axial inlet 47 and discharges the mixture of air and water, with the air now much more finely divided thanks to the action of rotor 41, through outlet 49, whence the air-water froth passes through outlet conduit 13 to discharge end 15, as described above.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Thus, it is not necessary that the pump be outside the tank. The pump can be of the submerged type and air inducted from a floating intake at water level. Or the pump can be secured to the inner side wall of the tank, the pump drive shaft and the air intake also passing through that wall, the air intake in this case being axial so as to insure that the air and water are both introduced into the central or intake part of the pump casing. Moreover, if it is found that clogging of the filter results in an undesirably great vacuum in the water intake, then a vacuum gauge can be provided on the water intake to indicate when it is time to change or clean the filter. These and other modifications and variations are considered to be within the purview and scope of the present invention as defined by the appended claims.

What is claimed is:

1. In combination with a fish tank, an aerator for the fish tank comprising a centrifugal pump having a central inlet and a peripheral outlet and being of the type adapted to receive substantial quantities of air at its inlet without losing its prime, said pump comprising a casing having a rotor that rotates within said casing, said rotor having thereon a plurality of blades of airfoil configuration, conduit means having an inlet end that rests removably on the bottom of said fish tank for introducing water from the bottom of said fish tank to an elevation above the upper edge of the fish tank and into the pump inlet, means for introducing air into the pump inlet, conduit means having its outlet end disposed adjacent the bottom of the fish tank for discharging mixed air and water from the pump outlet adjacent the bottom of the fish tank, and a filter on said inlet end for introducing water into the pump inlet, said filter resting removably on the bottom of the fish tank, said filter comprising a hollow body, and a conical screen whose apex is directed inwardly of said hollow body.

2. The combination claimed in claim 1, and a conical coarse metal wire screen disposed within the first-mentioned screen and resiliently removably retaining said first-mentioned screen on said hollow body.

3. An aerator as claimed in claim 1, said pump casing being conical, and said blades having leading and trailing edges that converge toward the apex of said conical casing.

* * * * *